Aug. 12, 1958    C. METRAL ET AL    2,846,951
CIRCULATOR
Filed Aug. 27, 1956
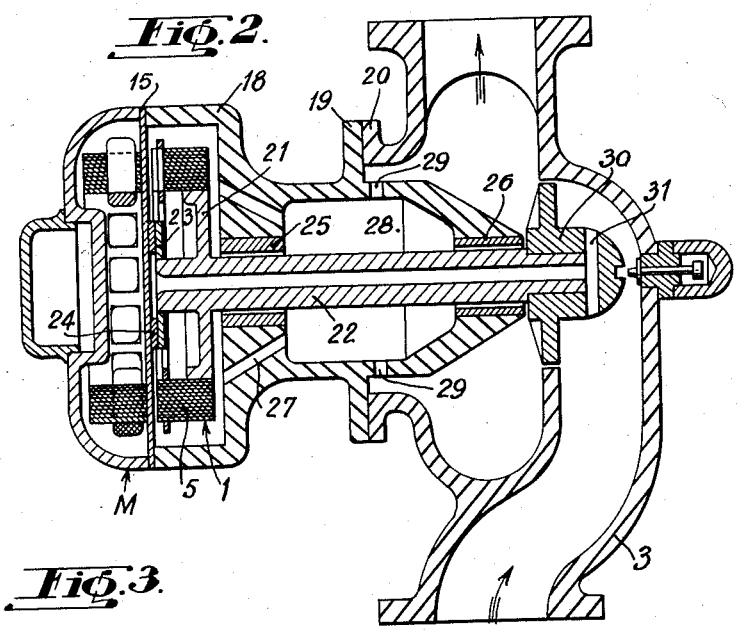
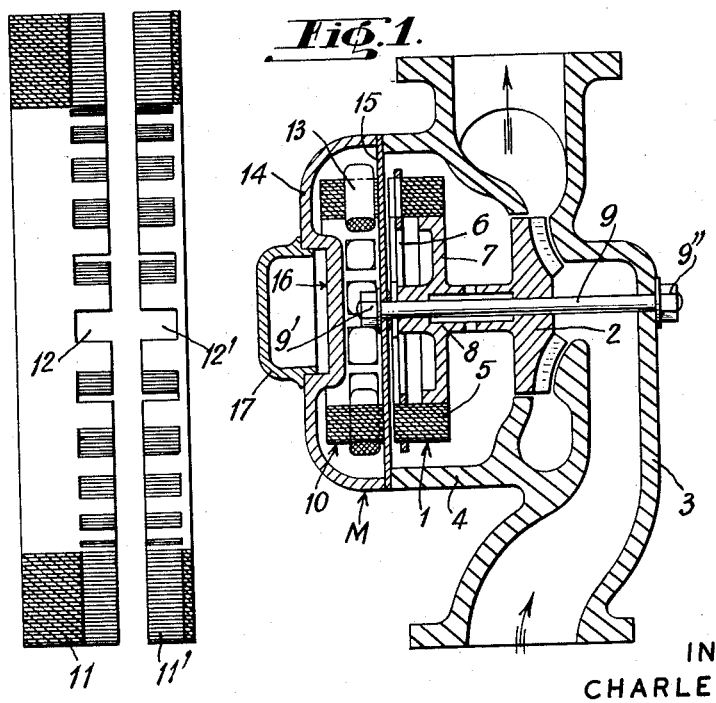
INVENTORS
CHARLES METRAL
ALBERT RICHARD

United States Patent Office 2,846,951
Patented Aug. 12, 1958

2,846,951
CIRCULATOR

Charles Metral, Ecully, and Albert Richard, Caluire, France, assignors to Societe Emerjy, Lyons, France, a corporation of France Application August 27, 1956, Serial No. 606,372

Claims priority, application Switzerland September 13, 1955

4 Claims. (Cl. 103—87)

The object of the present invention is a circulator comprising an electric motor the rotor of which drives a member fitted with vanes in order to induce the circulation of a fluid in a duct.

The circulator according to the invention is characterized by the fact that the said electric motor has an axial gap, and by the fact that a partition made of unmagnetic material is disposed between the rotor and the stator of the motor in order to separate them one from the other in a fluid-tight manner.

The accompanying drawing illustrates, by way of examples, two embodiments of the circulator constituting the object of the present invention.

Fig. 1 is a view of an axial cross-section of the first embodiment.

Fig. 2 is a view similar to that shown in Fig. 1 of the second embodiment.

Fig. 3 is a larger scale cross-sectional view of a detail.

The circulator illustrated in Fig. 1 comprises an electric motor generally indicated in M the rotor 1 of which drives the vane wheel 2 (of a turbine or of a pump) destined to induce the circulation of a fluid in a duct 3.

The rotor 1 is mounted inside a casing 4 which is in one piece of the duct 3 with which it communicates, so that the said rotor bathes in circulating liquid during the operation of the circulator which is to be described. This rotor is constituted by a ring formed by a spirally wound strip of soft iron as indicated in 5 and carrying a ring 6 forming a squirrel cage. The ring 5 is fixed to a disk 7 carrying a hub 8 rotatably mounted on a supporting axle 9. The wheel 2 which is shown as being in one piece with the hub 8 of the rotor is also rotatably mounted on the axle 9. This wheel could of course be manufactured separately from the rotor and be fixed coaxially to the latter by any usual means.

The stator 10 of the motor is constituted by two rings 11 and 11' as shown in Fig. 3, each ring is formed by a soft iron strip wound on itself in the same manner as the ring 5 of the rotor. Notches 12 and 12' are cut, for instance with a milling cutter, in the rings 11 respectively 11', and the latter are then fixed the one to the other by means of bolts or by exterior clamping with the notches 12 and 12' opposite to one another so as to form openings destined to receive a winding 13. The stator 10 is mounted inside a separate casing 14 destined to be fixed by bolts, which have not been shown, to the casing 4 of the rotor.

A partition 15 formed by a disk of unmagnetic material, such as for instance a rust-proof metal such as chromium, or a plastic material is disposed between the rotor and the stator of the motor so as to separate them one from the other in a fluid-tight manner.

The stator 10 is fixed to the bottom of the casing 14, but it could also be fixed to the partition 15. The axle 9 is bolted in 9' to the partition 15 and in 9" to the duct 3. The current connexion with the stator is effected through the bottom 16 of the casing 14, a cover 17 preventing access to the connexions which are not shown.

In the embodiment illustrated in Fig. 2, the rotor is mounted in a casing which is independent of the duct 3 to which it is fixed by means of a flange 19 bolted to a corresponding flange 20 of the duct 3.

The ring 5 of the rotor (which is identical with that of the previous embodiment) is fixed to a disk 21 which is in one piece with a hollow shaft 22. The extremity of this shaft 22 which is adjacent to the partition 15 carries an annular part 23 destined to bear up against a washer 24 secured to the partition 15.

The hollow shaft 22 is supported at one extremity in a bearing 25 formed in an interior partition of the casing 18 and at the other extremity in a bearing 26 formed in the extremity of the casing 18. These bearings are lubricated by the liquid in the duct 3, and to this effect comprise projecting nipples allowing the liquid to pass, as may be seen in Fig. 2. Ducts 27 establish a communication between the interior of a chamber 28 and the chamber containing the rotor so that the latter bathes in liquid which is not in circulation whilst the circulator is in operation. The chamber 28, on the other hand, communicates with the interior of the duct 3 through channels 29.

The vane wheel 30 is fixed to the extremity of the hollow shaft 22 protruding from the casing 18 so as to extend inside the duct 3. A duct 31 provided in the hub of the wheel 30 establishes a communication between the interior of the shaft 22 and the duct 3 so as to allow liquid to pass and to cool the annular part 23 rubbing against the washer 24.

The stator is identical with that shown in Fig. 1 and consequently will not be described.

What we claim is:

1. An electric circulating pump comprising a casing having an inlet and an outlet, an impeller rotatably mounted in said casing for receiving fluid from the inlet and pumping it to the outlet, said impeller having an axis of rotation substantially transverse to the direction of the inlet and the outlet, an annular rotor member in said casing connected to said impeller and spaced from said impeller along the axis of said impeller and rotatable about the axis of said impeller, a wall of non-magnetic material on said casing axially spaced from said rotor member on the opposite side of said rotor member from said impeller, and an annular stator member on the opposite side of said wall from said rotor member and spaced axially from said rotor member, at least one of said members having two annular parts consisting of a spirally wound metal strip, at least one of which annular parts has a plurality of radial notches therein for receiving a winding, said annular parts abutting each other to close said notches.

2. An electric circulating pump as claimed in claim 1 in which said stator is fixed to said non-magnetic wall.

3. An electric circulating pump as claimed in claim 1 and a shaft, one end of which is mounted on said non-magnetic wall and the other end of which is mounted on said casing, said annular rotor and said impeller being rotatably mounted on said shaft.

4. An electric circulating pump as claimed in claim 1 in which each annular member is notched, said annular members abutting each other with the notches opposed to each other.

References Cited in the file of this patent

UNITED STATES PATENTS

| | | |
|---|---|---|
| 2,444,687 | Widakowitch | July 6, 1948 |
| 2,635,547 | Cataldo | Apr. 21, 1953 |
| 2,688,946 | Jarsaillon | Sept. 14, 1954 |
| 2,782,721 | White | Feb. 26, 1957 |